United States Patent
Dieteman et al.

[11] 3,731,368
[45] May 8, 1973

[54] METHOD OF MAKING LEAD AND SOLDER PREFORM ASSEMBLY

[75] Inventors: Francis E. Dieteman, Nello Coda, both of Erie, Pa.

[73] Assignee: Erie Technological Products, Inc., Erie, Pa.

[22] Filed: June 1, 1971

[21] Appl. No.: 148,455

Related U.S. Application Data

[62] Division of Ser. No. 848,456, Aug. 8, 1969, Pat. No. 3,616,981.

[52] U.S. Cl. .................29/470.1, 29/482, 29/502, 29/628, 29/630
[51] Int. Cl. ........................................B23k 21/00
[58] Field of Search..................29/502, 628, 470.1, 29/482, 630 R, 630 A, 630 G; 228/56

[56] References Cited

UNITED STATES PATENTS

| 364,662 | 6/1987 | Norton | 29/502 X |
| 2,409,615 | 10/1946 | Daniel | 29/502 X |
| 2,421,047 | 5/1947 | Wolfson et al. | 29/502 X |
| 2,936,981 | 5/1960 | Aversten | 29/502 X |
| 2,246,931 | 6/1941 | Chiffey | 29/630 R |
| 2,739,369 | 3/1956 | Cooney | 29/470.1 X |
| 2,989,578 | 6/1961 | Wogner et al. | 29/630 A |
| 3,026,603 | 3/1962 | Zysk et al. | 29/470.1 X |
| 3,371,414 | 3/1968 | Gwyn, Jr. | 29/470.1 X |
| 3,446,912 | 5/1969 | Diehl et al. | 29/630 R X |

FOREIGN PATENTS OR APPLICATIONS

| 368,162 | 9/1959 | Japan | 29/628 |

Primary Examiner—J. Spencer Overholser
Assistant Examiner—Ronald J. Shore
Attorney—Ralph Hammar

[57] ABSTRACT

Leads for electronic components are provided with solder preforms by a method and apparatus which first cuts off a length of solder wire and then forms the wire into a preform and cold welds it to the lead.

1 Claim, 12 Drawing Figures

PATENTED MAY 8 1973    3,731,368

INVENTORS
Francis E. Dretzman
BY Nello Coda

Ralph Hammar
Attorney

METHOD OF MAKING LEAD AND SOLDER PREFORM ASSEMBLY

This application is a division of U.S. Pat. No. 3,616,981, application Ser. No. 848,456, filed Aug. 8, 1969.

This invention is intended to provide leads for electronic components with solder preforms cold welded to the areas at which the leads are to be attached to the component terminals. This eliminates the need for handling solder preforms.

Figure 1:
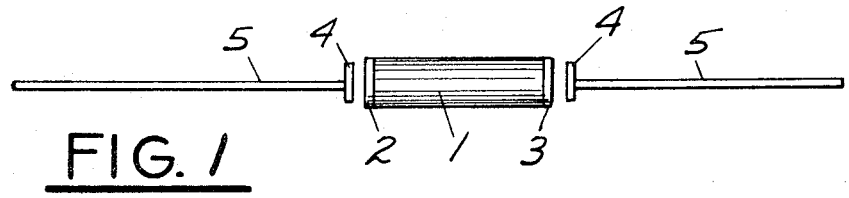
FIG. 1 is a diagrammatic elevation of an electronic component.

The component shown in FIG. 1 which may be a resistor, capacitor, etc., has a body 1 with end terminals 2, 3 which are to be soldered to the heads 4 of leads 5. This illustrates one of many common electronic components requiring leads.

Figure 2:
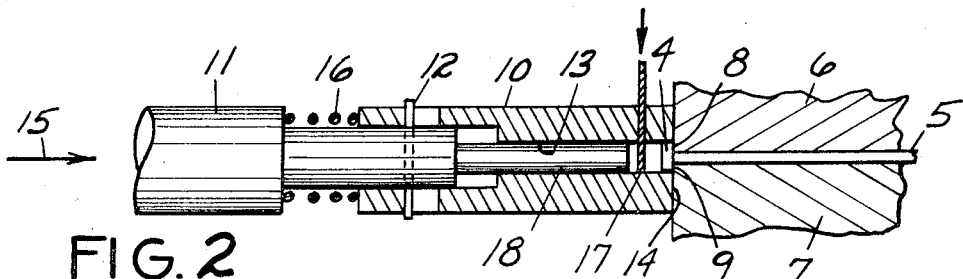
FIGS. 2, 3 and 4 are sectional views of apparatus for forming and cold welding solder preforms to a lead and FIGS. 5–12 inclusive are views of some leads used for electronic components.
Figure 3:
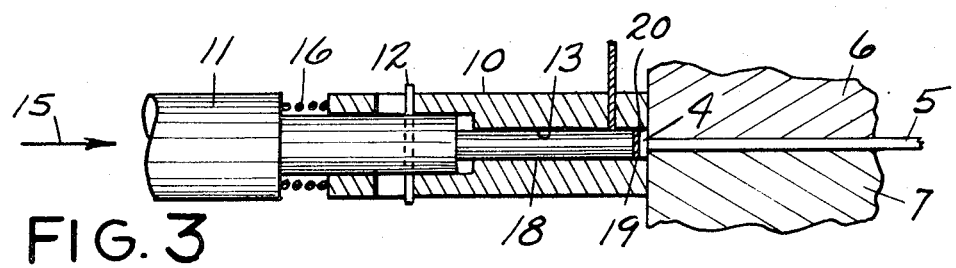
Figure 4:
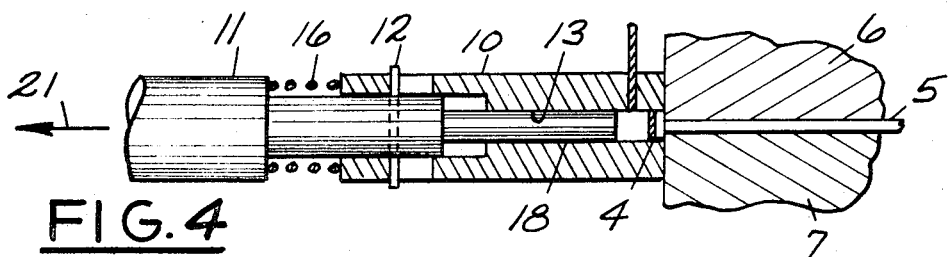

By the apparatus and method shown in FIGS. 2, 3 and 4, a solder preform of the required size is formed and cold welded to a lead at the location at which the soldered connection is to be made to the component terminal. The apparatus is shown applying the solder preform to the head 4 of the lead 5. The lead is gripped by a die having jaws 6, 7 with surfaces 8, 9 resting against the under side of the head 4 and providing a backup or supporting surface for the head. The solder preform is formed and attached to the head 4 by a punch comprising parts 10 and 11 connected to each other by a lost motion connection 12 such as the pin and slot connection illustrated. The part 10 has a bore or way 13 aligned with and receiving the head 4 and has an end surface 14 which butts or is stopped against the surfaces 8, 9 as the punch closes against the jaws 6, 7 by movement in the direction of arrow 15. As soon as the motion of the part 10 or housing of the punch is stopped by engagement with surfaces 8, 9, the part 11 of the punch continues its movement in the direction of arrow 15 and overcomes the pressure of spring 16 which normally holds the lost motion connection 12 between the parts 10 and 11 at the extreme left as shown in FIG. 2. Prior to the movement of the part 11 relative to the part 10, a length 17 of wire solder has been fed (by suitable means not shown) into the bore 13 through a way 17a transverse to the bore and in front of the section 18 of the part 11. During the initial movement of the part 11 relative to the part 10, the length 17 of solder wire is sheared off and upon continued movement in the direction of arrow 15, the sheared off length of solder wire 17 is formed into a preform 19 which is upset and cold welded to the adjacent surface of the head 4. If the bore 13 is slightly over size compared to the outside diameter of the head 4, some solder may be squeezed around the outside of the head as shown at 20 in FIG. 3. FIG. 4 shows the return stroke of the punch effected by movement of the part 11 in the direction of arrow 21. The lead with the solder preform 19 cold welded to its head may now be removed from the jaws 6, 7 and soldered to one of the terminals 2, 3 of the component 1. The soldering may be carried out by any of the usual operations such as fluxing, heating in a reducing atmosphere, etc.

FIGS. 5–12 inclusive indicate various leads to which solder preforms may be cold welded. The leads are of metals suitable for soldered connections such as copper, nickel, copper coated steel. The leads may also be of glass sealing alloys having coefficients of expansion matching the coefficients of expansion of specific glasses. Among these glass sealing alloys are Invar, Kovar.

Figure 5:
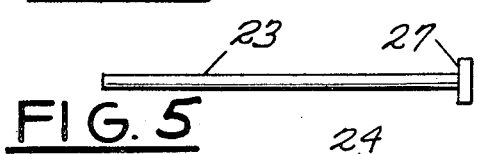
Figure 6:
Figure 7:
Figure 8:
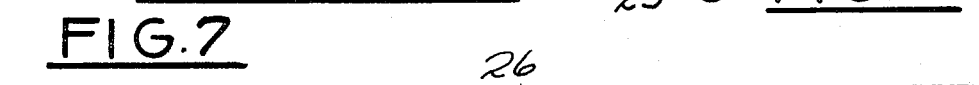
Figure 9:
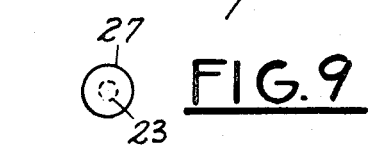
Figure 10:
Figure 11:
Figure 12:
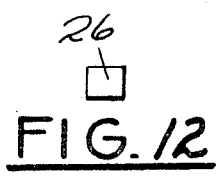

The shape of the wire is not critical. FIGS. 5, 6, 7, 9 and 10 show round wire 23, 24, 25. FIGS. 8 and 12 show square wire 26. Nor is the shape of the head of the lead critical. FIGS. 5 and 9 show a wire with a round head 27. FIGS. 6 and 10 show wire with a square head 28. Nor is it necessary that the wire be headed. FIGS. 7, 8, 11 and 12 show wire without a head. In this case, the solder preform would be attached directly to one end of the lead and would usually be coextensive with the lead end. No effort has been made to illustrate all possible shapes of wire leads.

The die which applies the solder may also be used to form the head 4. In this mode of operation, the jaws 6, 7 grip the lead 5 a short distance from the end so sufficient wire to form the head 4 projects into the bore 13 when the punch 10, 11 is fully closed against the die. In this mode, the punch would have two strokes. The first stroke (without solder) would form the head 4. The second stroke (with solder) would cold weld the solder to the freshly formed head, which would have a clean surface exposed to the solder to facilitate or promote welding. Also, the invention is not limited to feeding the solder in the form of wire. The die will cold weld to the head 4 other pre cut or pre formed shapes or measured quantities of solder placed in the bore 13 between the part 18 and the head 4.

What is claimed is:

1. The method of making a soldered connection between a terminal and an end surface of a lead wire transverse to the length of the lead wire providing the solder for making a soldered connection from said surface to said terminal which comprises
   1. supporting a lead wire in a supporting means with a portion of the lead wire projecting into a die cavity, upsetting said projecting portion to form an enlarged head on the lead with an end surface of the head distant from the lead wire transverse to the length of the lead wire, feeding a portion of solder in front of said end surface and impacting the solder against said end surface to shape the solder into a preform and cold weld the same to said end surface to provide a lead and solder preform assembly, and then
   2. removing the assembly from the supporting means and utilizing the assembly (Item 1) for making the soldered connection between said terminal and said surface with the preform providing the solder for making the connection and thereby eliminating the need for separate handling of a solder preform at the time of making the connection.

* * * * *